March 18, 1958 — F. R. SWANSON — 2,826,942
MACHINE FOR REMOVING BURRS FROM METAL
Filed Aug. 23, 1955 — 3 Sheets-Sheet 1
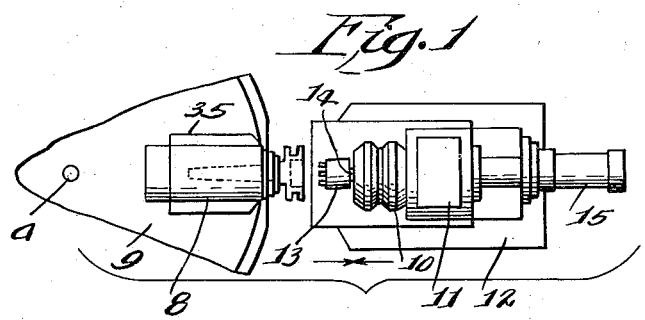
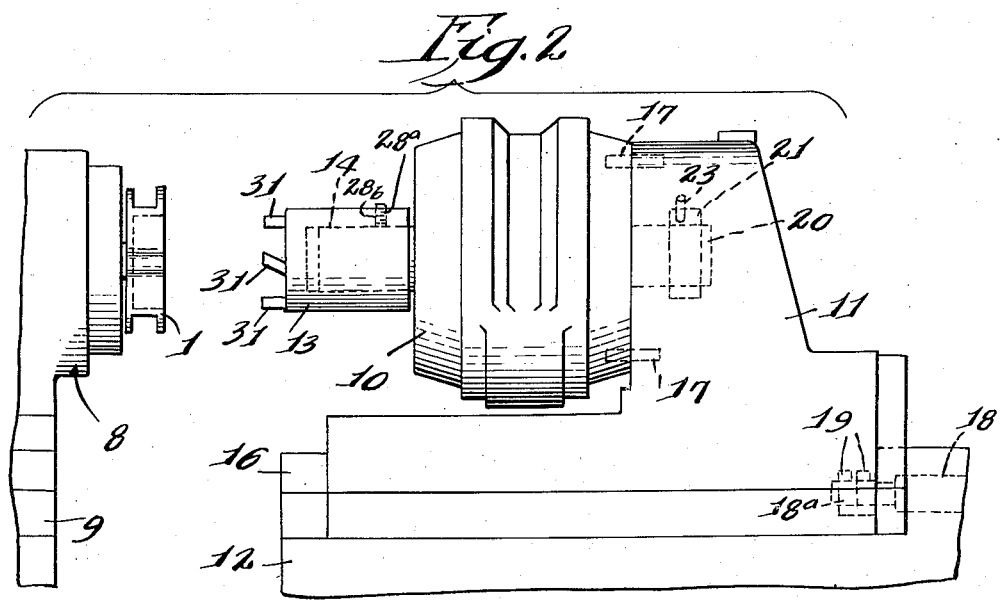
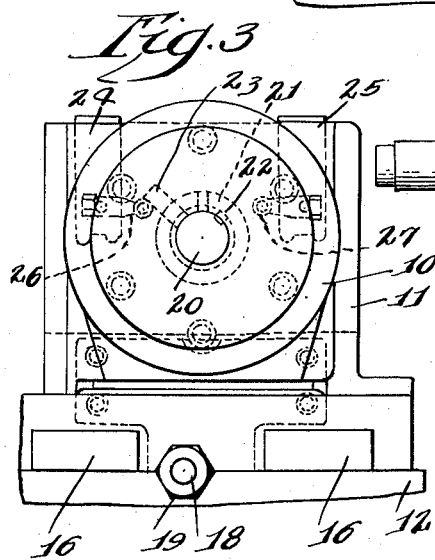
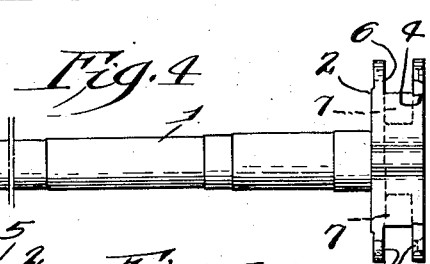
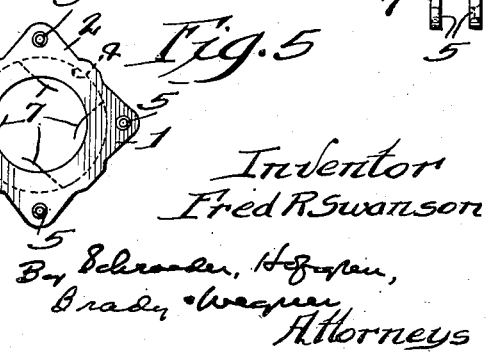
Inventor
Fred R Swanson
Attorneys

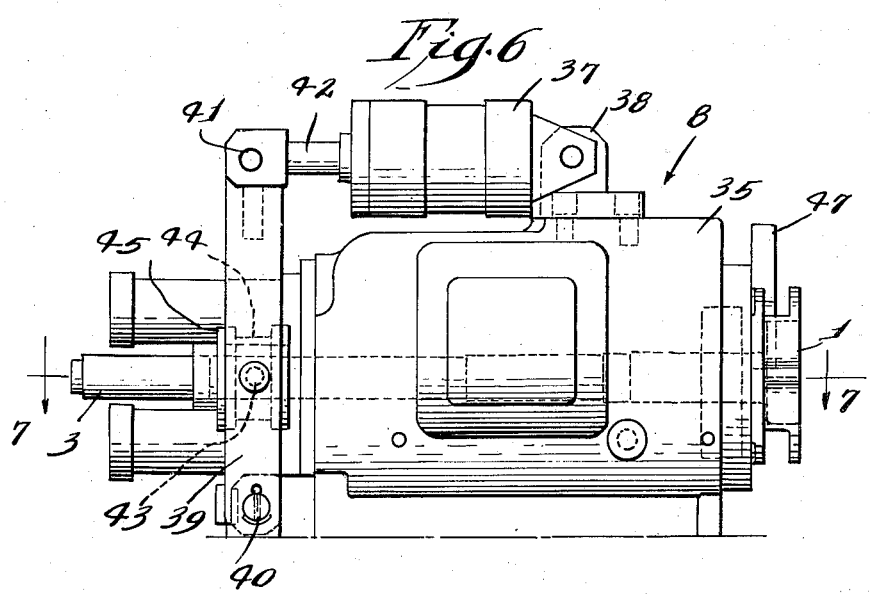
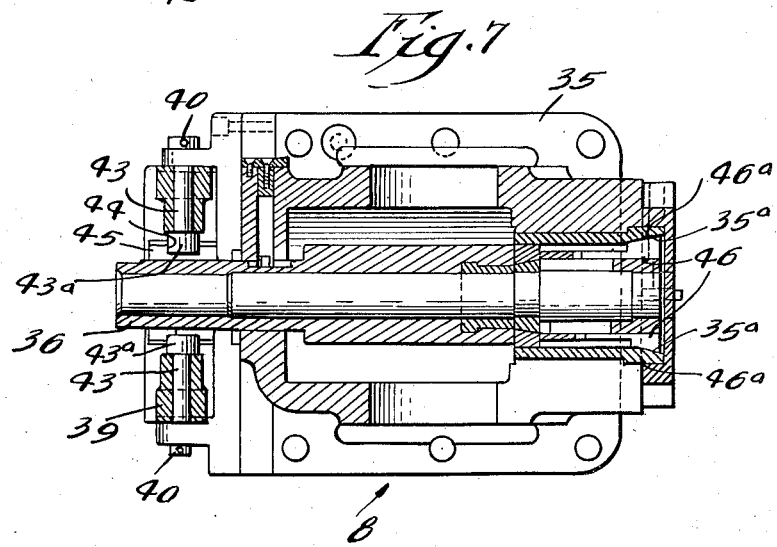

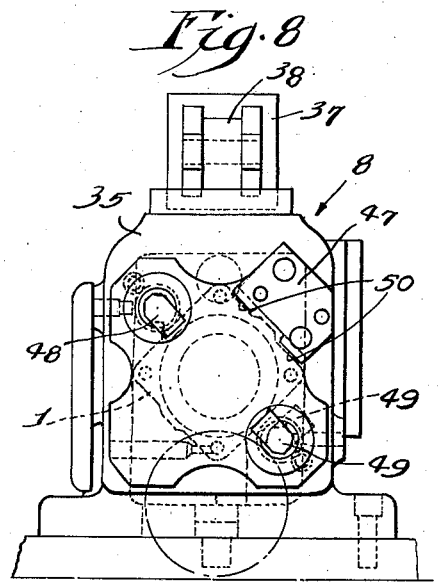
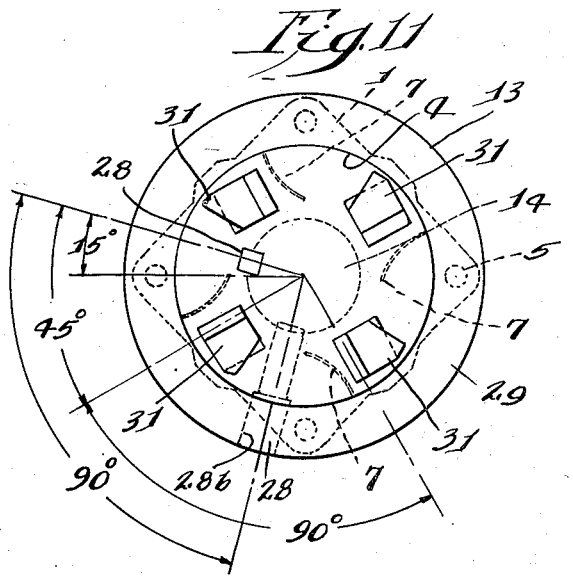
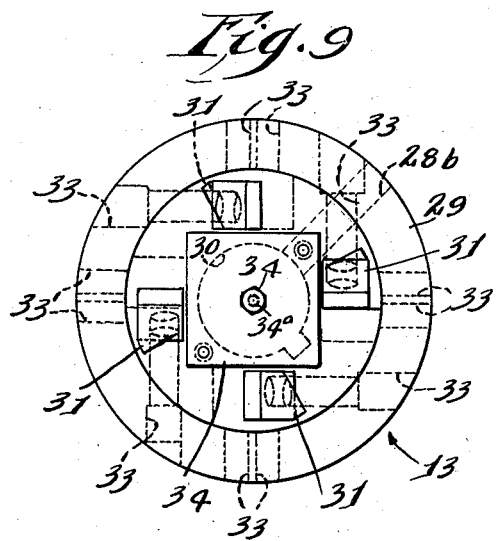
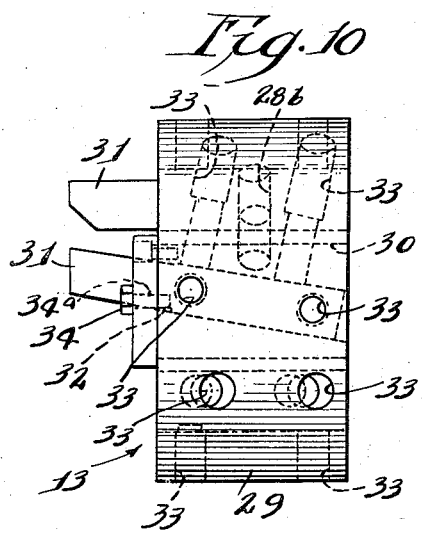

United States Patent Office 2,826,942
Patented Mar. 18, 1958

2,826,942

MACHINE FOR REMOVING BURRS FROM METAL

Fred R. Swanson, Rockford, Ill., assignor to Sundstrand Machine Tool Co., a corporation of Illinois Application August 23, 1955, Serial No. 530,070

3 Claims. (Cl. 77—3)

This invention relates to a deburring mechanism and, more particularly, to such a mechanism for removing burrs from an internal cylindrical surface of a metal workpiece.

A general object of this invention is to provide a new and improved deburring mechanism.

Another object of this invention is to provide a new and improved deburring mechanism wherein a workpiece having a burred internal cylindrical surface is nonrotatably clamped in alignment with a rotatable deburring tool so that the workpiece and tool may be moved longitudinally with respect to each other to position the tool within the workpiece whereby rotation of the tool removes the burrs.

A more detailed object of this invention is to provide a new and improved mechanism for removing a predetermined number of chips extending inwardly from an internal cylindrical surface of a workpiece, including a work holder for nonrotatably clamping the workpiece, a supporting base having horizontally extending ways, a hydromotor slidably mounted on the ways and having a shaft in alignment with the axis of the internal cylindrical surface, a deburring tool keyed to the hydromotor shaft having a plurality of cutters corresponding to the number of chips on the workpiece, and means for slidably moving the hydromotor along the ways to position the cutters within the cylindrical surface intermediate the chips extending therein so that the hydromotor may be rotated approximately 100° to remove the chips, the hydromotor then being slidably moved away from the workpiece and rotated back to its initial position.

Other objects and advantages will become apparent from the following detailed description taken in connection with the accompanying drawings, in which:

Fig. 1 is a fragmentary plan view of an embodiment of the invention;

Fig. 2 is an enlarged fragmentary front elevational view of Fig. 1;

Fig. 3 is a right end elevational view of Fig. 2;

Fig. 4 is a front elevational view of a typical workpiece to be deburred;

Fig. 5 is a right end elevational view of Fig. 4;

Fig. 6 is a front elevational view of the work holder;

Fig. 7 is a horizontal sectional view taken along line 7—7 of Fig. 6;

Fig. 8 is a right end elevational view of Fig. 6;

Fig. 9 is a left end elevational view of the deburring tool;

Fig. 10 is a front elevational view of Fig. 9; and

Fig. 11 is an end view showing the deburring cutters positioned in the workpiece preparatory for the cutting stroke.

While the invention herein described is a preferred embodiment, it is not intended to limit the invention to the specific form and arrangements shown, it being contemplated that various changes may be made by those skilled in the art without departing from the spirit and scope of the appended claims.

This invention is especially well adapted for removing internal burrs from a workpiece 1 such as that shown in Figs. 4 and 5. The deburring operation is one of a series of cutting operations performed on the workpiece 1. Initially the workpiece comprises a square portion 2 having a stem portion 3 extending from the center thereof. In successive steps a relatively large cylindrical bore or recess 4 is cut in the face of the square portion 2 and a relatively small hole 5 is drilled in each of the four corners of the square portion 2. A cutter is then moved inwardly somewhat radially toward each of the four corners of the workpiece 1 so as to form recesses 6 between the two faces of the square portion 2 and intersecting the relatively small drilled holes 5. In performing this last cutting operation, each of the cutting tools breaks through into the relatively large cylindrical bore 4 and forces a large chip 7 inwardly into said bore, each of said chips 7 remaining attached at one side thereof to the workpiece 1. This deburring mechanism is adapted to remove these four chips 7.

In the embodiment of the invention shown in the drawings and described herein, the deburring mechanism is shown as one of a series of machine tools in a layout adapted to perform efficiently all of the above mentioned cutting operations. In this machining layout a plurality of identical work holders 8 are disposed around the periphery of a horizontal circular table 9 which is mounted for rotation about its center, indicated at "a" in Fig. 1. The various machine tools for performing the cutting operations are fixedly disposed around the table 9 so that after the workpiece 1 is clamped in one of the work holders 8 at a loading station, it is successively indexed to each of the machining stations for the necessary cutting operations. The deburring mechanism described herein comprises one of these machining stations.

Referring now to Figs. 1 and 2, the invention comprises a work holder 8 for nonrotatably clamping a workpiece 1, an oscillatable device, as a hydromotor 10, secured to a fixture 11 slidably mounted on a supporting structure 12 and having a deburring tool 13 secured to a shaft 14 of the hydromotor 10. A hydraulic piston and cylinder device 15 is operably connected to move the hydromotor 10 into cutting position with respect to the clamped workpiece 1.

As shown in Fig. 2, the fixture 11 is slidably mounted on ways 16 extending horizontally on the supporting structure 12, the hydromotor 10 being secured to the fixture 11 by means of bolts 17. A piston rod 18 of the hydraulic piston and cylinder device 15 has a threaded end portion 18a secured to the fixture 11 by means of nuts 19 so that actuation of the piston and cylinder device 15 causes longitudinal movement of the fixture 11 and the hydromotor 10 on the ways 16.

The work holding device 8 is positioned so that the axis of the clamped workpiece 1 is in alignment with the axis of the hydromotor shaft 14. An end portion 20 of the hydromotor shaft 14 extends outwardly from the side of the hydromotor 10 away from the clamped workpiece 1. As best seen in Fig. 3, the end portion 20 has a sleeve member 21 secured thereto by a key 22. A radially extending member 23 secured in the sleeve 21 is adapted to actuate switches 24 and 25 by contacting, respectively, switch members 26 and 27.

The deburring tool 13 is secured on the hydromotor shaft 14 by means of a key 28 and a set screw 28a threaded in a bore 28b. The deburring tool 13, shown in detail in Figs. 9 and 10, comprises a cylindrical collar member 29 having a central bore 30 adapted to fit on the hydromotor shaft 14. Four cutters 31 are disposed in recesses 32 equidistantly spaced angularly around the collar member 29. The collar member 29 has a plurality of partially threaded bores 33 intersecting the recesses 32 and adapted to receive set screws for securing the cutters 31 in the recesses 32. An end plate 34 is secured on the face of the deburring tool 13 from which the cutters 31 extend and over the central bore 30, the end plate carrying a centrally disposed set screw 34a adapted to bear against the end of the shaft 14 to accurately locate the deburring tool 13 thereon.

In this invention it is of utmost importance that the deburring tool 13 be accurately disposed on the hydromotor shaft 14 in a predetermined angular position so that when the cutters 31 are moved into cutting position within the internal cylindrical bore 4 they are positioned intermediate the inwardly extending chips 7 which are angularly located in predetermined positons. The shaft 14 of the hydromotor 10 is oscillatable between two extreme positions determined by the movement of the vane (not shown) within the hydromotor casing. In this embodiment of the invention, the hydromotor shaft 14 is adapted to be rotated approximately 100°. Therefore, as shown in Fig. 11, the deburring tool 13 is keyed onto the shaft 14 by the key 28 so that in one extreme position of the hydromotor shaft 14, the cutters 31 on the deburring tool 13 are in alignment with the spaces between the chips 7 on the clamped workpiece 1. It is believed evident from Fig. 11 that rotation of the hydromotor shaft 14 and the cutters 31 through approximately 100° will thus efficiently remove the chips 7 on the workpiece 1. It is to be noted that if the workpiece has more or less chips than shown herein, another deburring tool with a corresponding number of cutters disposed therein may be keyed on the shaft 14 in the proper angular relation.

The work holding device 8 utilized with this embodiment of the invention is best shown in Figs. 6, 7 and 8 and includes a housing 35 having a hollow slidable sleeve assembly 36 adapted to matingly receive the stem portion 3 of the workpiece 1. A hydraulic cylinder and piston device 37 is pivotally mounted at one end to a member 38 projecting upwardly from the housing 35. A pair of angled downwardly extending levers 39 are pivotably mounted at their lower ends on a shaft 40, the upper ends of the levers 39 being pivotably secured by a pin 41 to the end of a piston rod 42 of the hydraulic piston and cylinder device 37. A pin 43 projects inwardly from each lever 39 intermediate the ends thereof, the pins 43 having end portions 43a fitting in an annular groove 44 formed in a collar 45 secured on the slidable work receiving sleeve assembly 36. The work receiving sleeve assembly 36 includes radially movable jaw members 46 having beveled portions 46a engageable with mating beveled portions 35a on the housing 35. To clamp the workpiece 1 in the work holding device 8, the stem portion 3 is inserted in the hollow sleeve assembly 36 and the hydraulic piston and cylinder device 37 is actuated, pivoting the levers 39 about the shaft 40 (counterclockwise in Fig. 6), thus, moving the collar 45 and the sleeve assembly 36 to the left forcing the jaw members 46 inwardly against the workpiece 1 to securely clamp the workpiece therein.

As best seen in Fig. 8, means are provided for angularly locating the workpiece 1 in the work holding device 8 in a predetermined position, including a guide plate 47 and two pivotally mounted clamping members 48 and 49. The guide plate 47 has two spaced aligned abutments 50 adapted to engage one edge of the square portion 2 of the workpiece 1 to properly align the workpiece 1 in the work holder 8. The pivotally mounted members 48 and 49 additionally act to properly locate the workpiece 1 in the work holder 8 and are engageable in the recesses 6 formed between the two faces of the square portion 2. As the workpiece 1 is inserted in the sleeve assembly 36, the members 48 and 49 are pivoted to out of the way positions, as shown by the broken line position of member 49 in Fig. 8. The members 48 and 49 are then pivoted to their full line positions in the recesses 6 of the workpiece 1.

As to the operation of this invention, after the workpiece 1 has been non-rotatably clamped in the work holder 8, the hydraulic piston and cylinder device 15 is actuated to slidably move the hydromotor 10 towards the workpiece 1, positioning the cutters 31 within the cylindrical bore 4 intermediate the chips 7. The hydromotor 10 is then actuated, rotating the shaft 14 and the cutters 31 through approximately 100°, thus, removing the chips 7. The hydraulic piston and cylinder device 15 is then actuated in the other direction to slidably move the hydromotor 10 away from the workpiece 1 and the cutters 31 out of the bore 4 so that the hydromotor 10 may be actuated in the other direction to rotate the shaft 14 back to its initial position.

I claim:

1. A mechanism adapted to remove a predetermined number of chips projecting from an internal cylindrical surface of a workpiece in a common plane comprising, in combination; a longitudinally-extending base having ways a work holder for nonrotatably clamping the workpiece in a predetermined angular position disposed adjacent one end of the ways, an intermittently operable motor mechanism having a shaft extending therefrom, means slidably mounting said mechanism on said ways with the shaft in alignment with the axis of the workpiece, means for slidably moving said mechanism along the ways toward and away from the clamped workpiece between limit positions, and a deburring tool having a series of cutters corresponding to the number of chips on the workpiece keyed to the shaft of said mechanism, said deburring tool being keyed to said shaft in a predetermined angular position so that when said mechanism is moved along the ways toward the clamped workpiece to its limit position, the cutters will be received within the cylindrical surface intermediate the chips projecting therefrom and in the plane thereof, said cutters then being rotated past the chips by said mechanism to remove the chips.

2. A deburring mechanism adapted for removing a series of chips broken out of an inner cylindrical surface of a workpiece and extending inwardly therein comprising, in combination; a device for nonrotatably clamping such a workpiece with the axis of the cylindrical surface extending in a predetermined line axially therein, guide means on said device for angularly locating the workpiece therein with the chips at predetermined angularly spaced positions, a supporting structure having longitudinally extending ways thereon parallel to the axis of a workpiece in the clamping device, a hydromotor slidably carried on the ways and having its shaft parallel to the ways and in alignment with the axis of the cylindrical surface of a workpiece clamped by said device and intermittently rotatable for a part of a revolution between predetermined angularly spaced positions, a deburring tool keyed to the end of the hydromotor shaft adjacent the workpiece and having a series of cutters corresponding to the number of chips on the workpiece, hydraulic cylinder and piston means on said supporting structure operable to reciprocably move said hydromotor on the ways between spaced apart cutting and withdrawn positions, said cutters adapted to be slidably moved into the workpiece opening intermediate the chips whereupon the cutters are rotated part of a revolution by operation of the hydromotor in one direction to remove the chips, then slidably moved out of the workpiece, and thereafter rotated back part of a revolution in the reverse direction by the hydromotor to their initial position.

3. A deburring mechanism for removing one or more chips broken out of an inner cylindrical surface of a workpiece and extending inwardly therein in a common plane comprising: means for clamping such a workpiece with the axis of the cylindrical surface extending in a predetermined line axially therein; a supporting structure; a hydromotor on said supporting structure having a shaft extending therefrom axially aligned with the axis of said clamping means and intermittently rotatable for a part of a revolution; a series of cutters corresponding in number to the chips on the workpiece and carried on said shaft; means for shifting said hydromotor toward said clamping means to position the cutters in the plane of the chips and between the chips, said hydromotor shaft then being rotated part of a revolution to remove the chips whereupon said hydromotor is shifted away from said clamping means.

References Cited in the file of this patent

UNITED STATES PATENTS

| | | |
|---|---|---|
| 1,964,474 | Lindquist | June 26, 1934 |
| 2,376,746 | Zimmerman | May 22, 1945 |
| 2,533,451 | Ginsburg | Dec. 12, 1950 |
| 2,583,246 | Williams | Jan. 22, 1952 |